J. C. STEUTERMANN.
Air-Forcing Engine.

No. 209,524.　　　　　　Patented Oct. 29, 1878.

Witnesses.
F. Hunnewell.
Louis A. Curtis.

Inventor
J. C. Steutermann.
F. Curtis, Atty.

UNITED STATES PATENT OFFICE.

JOHN C. STEUTERMANN, OF BOSTON, MASSACHUSETTS, ASSIGNOR TO
A. D. PUFFER & SONS, OF SAME PLACE.

IMPROVEMENT IN AIR-FORCING ENGINES.

Specification forming part of Letters Patent No. 209,524, dated October 29, 1878; application filed September 12, 1878.

*To all whom it may concern:*

Be it known that I, JOHN C. STEUTERMANN, of Boston, in county of Suffolk and State of Massachusetts, have invented certain Improvements in Air-Forcing Engines, of which the following is a specification:

These improvements relate to a class of air-forcing engines or machines in which the pressure of water under head is transmitted and made available by the employment of a vessel open at certain times to the admission of air and water, the water entering at one point and expelling the air at another until the vessel may become full or partly full of water and the pressure has been utilized, when the water is allowed to escape and the air to enter, and the functions of the engine thus renewed, the power of the engine being equal to the pressure of the water as it enters the vessel.

My improvements consist in mechanical devices for governing the entrance and exit of air and water, and will be duly explained hereinafter.

Figure 1:
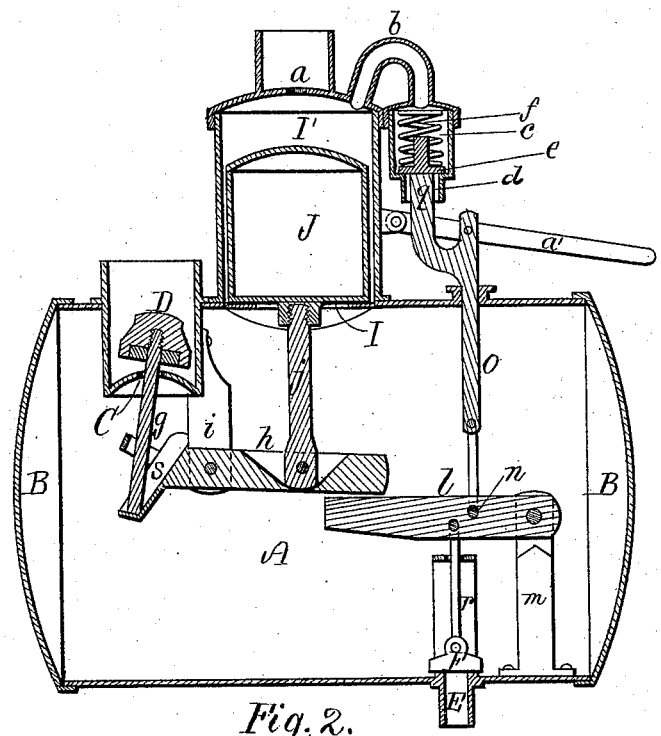
Figure 2:
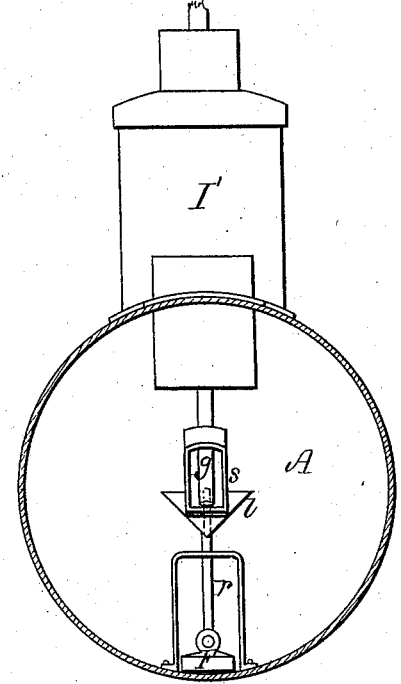

The drawings accompanying this specification, and which illustrate my improvements, represent, in Figure 1, a vertical and longitudinal section, and in Fig. 2 a cross-section, of an engine embodying my improvements.

Referring to the drawings above mentioned, it will be seen that A represents a vessel composed of a straight horizontal cylinder, closed at the ends by heads B B, and provided at the top at one end with a water-inlet port, C, which is provided with a drop-valve D, to regulate the admission of water under pressure to the interior of the vessel A; and the vessel A, further, has at its lowest part a water-escape port or outlet, E, which is provided with a drop-valve, F, to close it against escape of water. At the upper central part of the vessel A, and at the bottom of a dome, I', which surmounts it, is an air-escape port or passage, I, and above this port, and within the dome, is placed a valve, J, which closes down upon it, such valve rising and permitting of escape of air from the interior of the vessel, as it is crowded out by the influx of water under pressure, but closing down upon and closing the port when the pressure above it exceeds that below it, thus preventing the loss of pressure which would otherwise ensue. Communicating with the interior of the dome, above its valve or plunger J, I arrange a short air-inlet pipe, $b$, which communicates with the interior of a valve-box, $c$, arranged in immediate proximity to the upper part of the dome, said valve-box $c$ having an air-inlet port, $d$, in its bottom, covered by a drop-valve, $e$, which preferably is crowded upon its seat by a spring, $f$, placed between it and the cover of the box.

The stem of the water-inlet valve D is shown at $g$ as extending downward into the interior of the vessel A, and resting upon one end of a horizontal lever, $h$, which is disposed about centrally and longitudinally of said vessel, and is pivoted to a hanger, $i$, depending from its top. Midway or thereabout between the opposite end of the lever $h$ and its pivot I pivot the lower end of a vertical rod, $j$, which bears upon its top the valve J, before alluded to. The free end of the lever $h$ rests upon or stands immediately over the inner end of a second horizontal lever or latch, $l$, which is disposed longitudinally within one end of the vessel A and below the lever $h$, the outer end of this latch $l$ being pivoted to a post, $m$, erected upon the bottom of the vessel. At a point near the pivot of the lever or latch $l$ I pivot, as shown at $n$, the lower extremity of a vertical lifter-rod, $o$, which extends upward through the top of the vessel A by a stuffing-box, and carries a bent arm or finger, $q$, which enters loosely the lower part of the valve-box $c$ and abuts against the under side of the valve $e$, the upper end of this lifter-rod $o$ being pivoted to a hand-lever, $a'$, whose base is pivoted to the side of the dome I'. At a point between the pivot of the latch $l$ and its inner or free end, and near the pivot of the rod $o$, I pivot, in its turn, the upper extremity of a vertical rod, $r$, the lower end of which rod is pivoted to the top of the drop-valve F, before alluded to as covering the water-escape port E, Proper connection is to be made between the water-inlet C and a supply of water under pressure, and a suitable coupling is to be added to the air-escape port or dome I, whereby connection may be made to convey the air under pressure from the vessel A to the point where it is to be used—a keg of lager-beer, for instance—as my engine is especially adapted to charging such kegs.

Under the normal condition or parts the water-inlet is closed while the water-outlet is open, and no water stands in the vessel A, and the air-inlet valve is open to admit air to such vessel.

The operation of my engine is as follows: Connection is made between the faucet of the beer-keg and the outlet of the dome I', and the attendant lowers the lever $a'$, which closes the port $d$ and shuts off admission of air to the interior of the vessel A, at the same time closing the water-outlet E and opening the water-inlet C, and water consequently enters the vessel A through the port C and crowds the air in the latter upward through the outlet I', this entrance of water and escape of air continuing until the requisite power has been used.

When the keg is fully charged the attendant raises the lever $a'$ and the rod $o$, which, through the instrumentality of the lever or latch $l$ and valve-stem $r$, raises the valve F and opens the water-outlet E, while simultaneously with the opening of the said outlet E the water-inlet valve D drops upon its seat by the lowering of the lever $h$ at the hands of the plunger J, and further entrance of water to the vessel A is shut off, while simultaneously also with the opening of E and closing of C the air-inlet valve $e$ is raised by the ascent of the lifter $q$, and air permitted to enter and fill the vessel A as the water recedes from the latter by the port E.

In order to provide a simple and effective means of overcoming the pressure of water upon the top of the valve D in the act of opening the latter, I affix to the free end of the lever $h$ an inclined wiper-cam, $s$, which, as this end of the lever rises, exerts a leverage to force the valve-stem $g$ to one side of the perpendicular, and thereby tip the valve upon its seat, and gradually open the port before fully raising the valve bodily off its seat.

Having thus described the nature and purposes of my invention, I claim, and desire to secure by Letters Patent of the United States, as follows:

1. The general combination and arrangement of operative parts, substantially as herein explained, consisting of the vessel A, ports and valves C, D, E, F, and I, plunger J, levers $h$ and $l$, and lifter $q$, carried by the rod $o$, the stems $g$ and $j$ being pivoted to the lever $h$ and the stem $r$ and lifter-rod $o$ to the lever $l$, and the whole operating substantially as and for purposes set forth.

2. The inclined wiper-cam $s$, applied to the lever $h$, and operating with the stem of the water-supply valve D, substantially as and for purposes stated.

3. The air-inlet pipe $b$, with its valve $e$, in combination with the vessel A and the lifter $q$, substantially as and for purposes stated.

J. C. STEUTERMANN.

Witnesses:
F. CURTIS,
LOUIS A. CURTIS.